(12) United States Patent
Dhanadevan et al.

(10) Patent No.: US 10,708,140 B2
(45) Date of Patent: Jul. 7, 2020

(54) AUTOMATICALLY UPDATING ZONE INFORMATION IN A STORAGE AREA NETWORK

(71) Applicant: HEWLETT PACKARD ENTERPRISE DEVELOPMENT LP, Houston, TX (US)

(72) Inventors: Komateswar Dhanadevan, Bangalore (IN); Harish Chapalamadugu, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 145 days.

(21) Appl. No.: 15/953,685

(22) Filed: Apr. 16, 2018

(65) Prior Publication Data

US 2019/0319846 A1 Oct. 17, 2019

(51) Int. Cl.
*H04L 12/24* (2006.01)
*H04L 29/08* (2006.01)
*H04L 12/40* (2006.01)

(52) U.S. Cl.
CPC .......... *H04L 41/12* (2013.01); *H04L 67/1097* (2013.01); *H04L 12/40* (2013.01)

(58) Field of Classification Search
CPC ...... H04L 41/12; H04L 67/1097; H04L 12/40
See application file for complete search history.

(56) References Cited

U.S. PATENT DOCUMENTS

| 7,107,328 B1 * | 9/2006 | Muthiyan | H04L 29/06 709/220 |
| 8,892,750 B1 | 11/2014 | Krishnan et al. | |
| 9,021,198 B1 | 4/2015 | Vijayan et al. | |
| 9,054,945 B1 | 6/2015 | Krishnan et al. | |

(Continued)

FOREIGN PATENT DOCUMENTS

| CN | 105577436 A | 5/2016 |
| WO | WO-2016195634 A1 | 12/2016 |

OTHER PUBLICATIONS

Veritas Support, "What is Persistent Binding? What are the advantages of Persistent Binding?", (web page), Jan. 21, 2015, 3 pages.

(Continued)

*Primary Examiner* — Nicholas R Taylor
*Assistant Examiner* — Sanjoy K Roy
(74) *Attorney, Agent, or Firm* — Trop, Pruner & Hu, P.C.

(57) ABSTRACT

Examples disclosed herein relate to automatically updating of zoning information in a SAN. In an example, a network switching device in a SAN may automatically detect a new HBA port at a port where a prior HBA port was coupled. In response to detecting, network switching device may automatically determine a zone that the prior HBA port belonged to, from a map database on network switching device that stores mapping information comprising an ID of the prior HBA port, an ID of the port, a zone name associated with the ID of the port, and a status of the zone. In response to determining, network switching device may automatically update zoning information on network switching device to (Continued)

replace the ID of the prior HBA port with an ID of the new HBA port, for the zone that the prior HBA port belonged to.

20 Claims, 5 Drawing Sheets

(56) References Cited

U.S. PATENT DOCUMENTS

| | | | |
|---|---|---|---|
| 2006/0036822 A1* | 2/2006 | Kaji | H04L 67/1097 |
| | | | 711/163 |
| 2009/0172144 A1* | 7/2009 | Shimooka | G06F 3/0622 |
| | | | 709/223 |
| 2014/0108666 A1* | 4/2014 | Chen | H04L 49/357 |
| | | | 709/227 |
| 2018/0278575 A1* | 9/2018 | Varghese | H04L 61/20 |
| 2019/0312783 A1* | 10/2019 | Janardhana | H04L 41/0893 |

OTHER PUBLICATIONS

Emulex, "HBAnyware® Utility: Version 4.1, User Manual," (excerpt), 2009, pp. i-ii and 86-89.

American National Standards Institute, Inc., "Fibre Channel—Framing and Signaling-2 (FC-FS-2)", Rev 1.00, Apr. 3, 2006, 417 pages.

American National Standards Institute, Inc., "Fibre Channel—Generic Services—7 (FC-GS-7)", Jul. 17, 2016, 395 pages.

Virtualcloudz, "Server HBA Replacement Steps," (Research Paper), 2015, 8 pages, http://virtualcloudzz.blogspot.in/2015/06/server-hba-replacement-steps.html.

Cisco, "Configuring FlexAttach Virtual pWWN", Cisco MDS 9000 Family NX-OS Interfaces Configuration Guide, Feb. 11, 2018, 6 pages.

* cited by examiner

AUTOMATICALLY UPDATING ZONE INFORMATION IN A STORAGE AREA NETWORK

BACKGROUND

A Storage Area Network (SAN) is a high-speed network that may connect multiple storage devices with multiple servers. A SAN provides block-level storage that may be accessed by applications running on any associated server. A storage area network removes storage from servers and consolidates it in a manner that each server in a SAN may access shared storage as if it is directly attached to the server. A SAN thus serves as a pool of storage for servers in the network.

BRIEF DESCRIPTION OF THE DRAWINGS

The following detailed description references the drawings, wherein.

DETAILED DESCRIPTION

A SAN typically includes a dedicated network of storage devices that are generally not accessible through the local area network (LAN) by other devices. SAN can play a useful role in a data center by providing access and connectivity between storage arrays and servers via a dedicated network. This dedicated network may use, for example, Fiber Channel (FC) storage protocol.

In some examples, zoning may be implemented in a SAN to control who can see what in a SAN. Zoning is a logical separation of traffic between host and resources. By breaking up a network into zones, processing activity can be distributed across a network so that no single device is overburdened. To build a SAN zone, an administrator may consider information related to, for example, network fabric, switch ports, target ports, initiator ports, SAN fabric usage pattern, target storage system, target port availability, customer Service Level Agreement (SLA), and zone design pattern, etc.

In an example, zoning may be based on World Wide Names (WWNs), for example, of Host Bus Adapters (HBAs) or target devices. A WWN is a unique identifier that is assigned to a manufacturer by the Institute of Electrical and Electronic Engineers (IEEE) and hard-coded into a Fibre Channel (FC) device. For example, an FC device may have a WWN for the device itself, called a worldwide node name (WWNN), or WWNs for each of its ports, called a port WWN or worldwide port name (WWPN), or both. The port WWNs of an HBA may be part of multiple zones at the same time. In case an HBA needs replacement, for example, if the existing one goes bad or if the storage administrator wants to upgrade, all applicable zones in the fabric may have to be updated appropriately, which is a tedious task. This is especially true in case of a large number of HBA ports since the number of zones may proportionately increase, which further increases the complexity of managing zones.

To address these technical challenges, the present disclosure describes various examples for updating zoning information in a SAN. In an example, a network switching device in a Storage Area Network (SAN) may automatically detect a new HBA port at a port where a prior HBA port was coupled. In response to detecting the new HBA port, the network switching device may automatically determine a zone that the prior HBA port belonged to, from a map database on the network switching device. The map database stores mapping information comprising an ID of the prior HBA port (such as its WWPN), an ID of the port, a zone name associated with the ID of the port, and a status of the zone. In response to determining the zone that the prior HBA port belonged to, the network switching device may automatically update zoning information on the network switching device to replace the ID of the prior HBA port with an ID of the new HBA port, for the zone that the prior HBA port belonged to.

Figure 1:
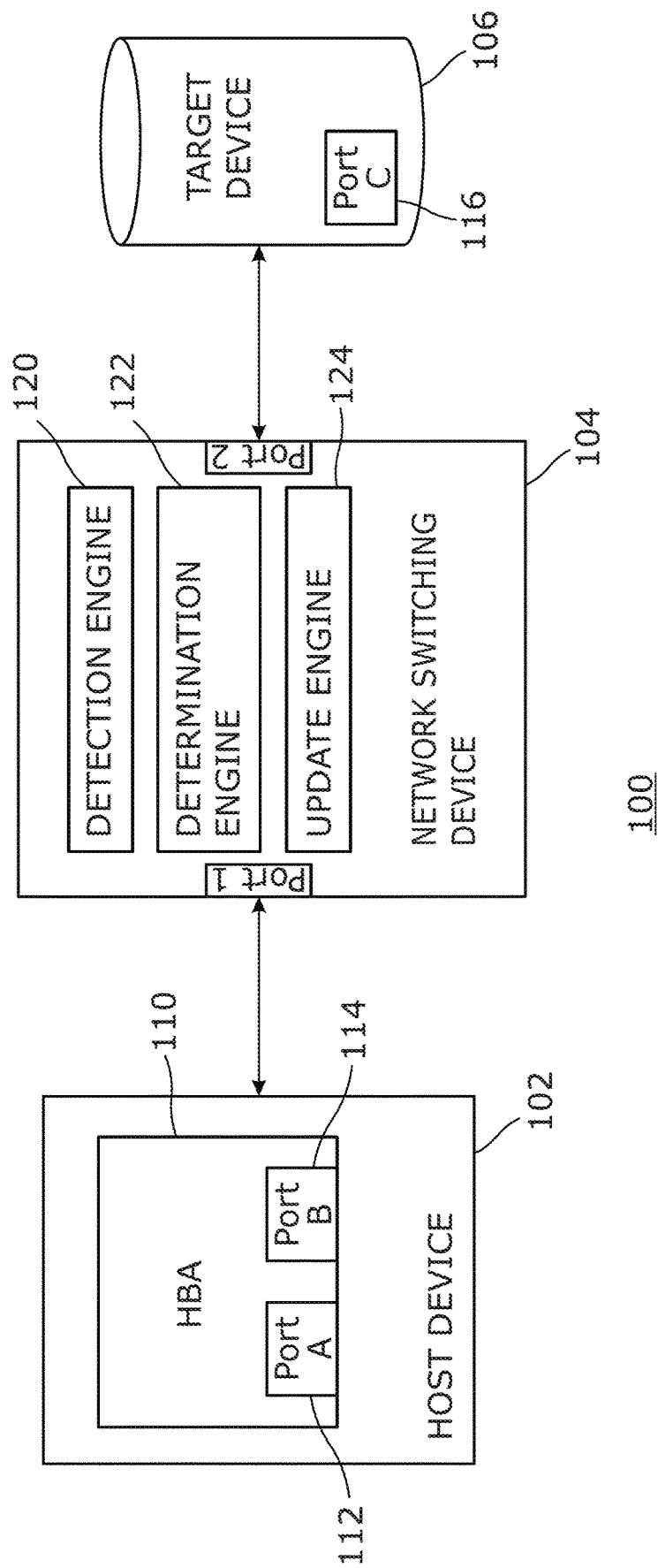
FIG. 1 is a block diagram of an example computing environment for automatically updating zoning information in a SAN.

FIG. 1 is a block diagram of an example computing environment 100 for automatically updating zoning information in a SAN. In some examples, computing environment 100 may include a host device 102, a network switching device 104, and a target device 106. The host device 102 may be communicatively coupled to target device 106 via a network fabric (or "fabric"), which includes the network switching device 104. Although one host device, one network switching device, and one target device are shown in FIG. 1, other examples consistent with this disclosure may include more than one host device, more than one network switching device, and more than one target device. In some examples, computing environment 100 may represent a storage area network.

Host device 102 may represent any type of computing device capable of reading machine-executable instructions. Examples of host device 102 may include, without limitation, a server, a desktop computer, a notebook computer, a tablet computer, a thin client, a mobile device, a personal digital assistant (PDA), and the like. For example, the host device 102 may include a processor (not illustrated), a memory (not illustrated), and an HBA 110. As used herein, the term "server" may include a computer and/or a computer program (machine-readable instructions) that may process requests from other (client) computers over a network.

The HBA 110 may include one or more ports, such as the ports A 112 and B 114 illustrated in FIG. 1. The HBA 110 may provide an interface between other components of the host device 102 (such as a disk driver, a VMFS driver, etc.) and external devices such as the network switching device 104 and the target device 106. The HBA 110 may, for example, convert or translate instructions from the other components of the host device 102 into commands that the network switching device 104 or target device 106 can process or understand (for example, SCSI commands), and transmit these commands and any related data to the network fabric via one of its ports using a protocol of the network fabric. It should be understood that any device that is capable of performing the operations described above may serve as the HBA 110, even if that device is not called an HBA in normal usage. For example, the HBA 110 could be called an SCSI driver, a host adapter, a host bus adapter (HBA), or the like.

Target device 106 may be a storage device, storage software, or any combination thereof. The storage device may be an internal storage device, an external storage device, or a network attached storage device. For example the storage device may include a hard disk drive, a storage disc drive (for example, a CD-ROM drive, a DVD drive, etc.), a tape storage drive, a solid state drive, a USB drive, a Serial Advanced Technology Attachment (SATA) disk drive, a Fibre Channel (FC) disk drive, a Serial Attached SCSI (SAS) disk drive, a magnetic tape drive, an optical jukebox, and the like. In some examples, the storage device may be a Direct Attached Storage (DAS) device, a Redundant Array of Inexpensive Disks (RAID), a data archival storage system, or a block-based device over a storage area network (SAN). In one example, the storage device may be a storage array, which may include one or more storage drives (for example, hard disk drives, solid state drives, etc.).

Network switching device 104 may refer to any type of networking device that may be capable of routing packets. Some non-limiting examples may include a network switch (e.g., FC switch or FCoE switch), a network router, a virtual switch, or a virtual router. The network switching device 104 may be configured to perform operations described herein in relation to automatically updating zoning information in a SAN, such as the operations described below in relation to FIG. 4. For example, the network switching device may perform these operations by way of a detection engine 120, a determination engine 122, and an update engine 124, which are described in greater detail below in relation to FIG. 2.

As noted above, host device 102 may be communicatively coupled to target device 106 via a network fabric (or "fabric"). As used herein, the term network fabric may refer to a network topology in which components may exchange data with each other through interconnecting network devices. Specifically, the network fabric may include the network switching device 104 (e.g., FC switch or FCoE switch), and, in some examples, any number of additional network devices such as: network switching devices, network routers, cables, etc. Host device 102 may connect to the network fabric via the HBA 110.

Some example communication protocols that may be used by host device 102 to communicate with target device 106 via the network fabric may include Fibre Channel (FC), Ethernet, Internet Small Computer System Interface (iSCSI), and Fibre Channel over Ethernet (FCoE).

In some examples, host device 102 may be referred to as an "initiator". The initiator may initiate a connection over the network fabric to one or multiple ports ("target ports") on target device 106. A target port may provide access to a storage volume (e.g., the target device 106) for the initiator.

As mentioned earlier, in some examples, Fibre Channel protocol may be used as the communication protocol by a host device (for example, 102) to communicate with target device 106 via the network fabric. In some examples, Fibre Channel zoning may be implemented in SAN. As used herein, Fiber Channel zoning may include partitioning of a Fibre Channel fabric into smaller subsets to, for example, restrict interference, add security, and simplify management of SAN. Through zoning, devices in SAN may be divided into logical groups over the physical configuration of the network fabric. Zoning may limit a device in SAN to access a controlled subset of other devices or ports. Each device in SAN may be placed into multiple zones.

A zone set may comprise one or more zones. A zone may be a member of more than one zone set and comprise multiple zone members. Members in a zone may access each other, however members in different zones cannot access each other. A device may belong to more than one zone.

As mentioned above, in some examples, network switching device 104 may include a detection engine 120, a determination engine 122, and an update engine 124.

Engines 120, 122, and 124 may include any combination of hardware and programming to implement the functionalities of the engines described herein, but at least include hardware that is configured to perform the functionalities. In examples described herein, such combinations of hardware and programming may be implemented in a number of different ways. For example, the programming for the engines may be processor executable instructions (e.g., network switch firmware) stored on at least one non-transitory machine-readable storage medium and the hardware for the engines may include at least one processing resource to execute those instructions. In some examples, the hardware may also include other electronic circuitry to at least partially implement at least one engine of network switching device 104. In some examples, the at least one machine-readable storage medium may store instructions that, when executed by the at least one processing resource, at least partially implement some or all engines of network switching device 104. In such examples, network switching device 104 may include the at least one machine-readable storage medium storing the instructions and the at least one processing resource to execute the instructions. It should be understood that the engines 120, 122, 124 do not necessarily have to be formed from logically or physically distinct entities in the network switching. For example, the same processing resource could instantiate each of the engines 120, 122, and 124. As another example, processor executable instructions corresponding to the engines 120, 122, 124 are not necessarily organized into distinct modules or services.

As mentioned earlier, host device 102 may connect to the network fabric (for example, network switching device 104) via an HBA 110. In an example, the HBA 110 may be assigned a unique identifier i.e. a World Wide Node Name (WWNN), and each of the ports on the HBA 110 may be assigned a port WWN (also referred to as a worldwide port name, or WWPN). Referring to FIG. 1, ports A 112 and B 114 on HBA 110 may be assigned unique identifiers WWPN-A and WWPN-B, respectively. Further, each port on target device 106 may be assigned a WWPN as well. Referring to FIG. 1, port C 116 on target device 106 may be assigned a unique identifier WWPN-C.

In an example, WWPN-A on host device 102 may be communicatively coupled to a port (e.g., port 1) on network switching device 104, and WWPN-C on target device 106 may be communicatively coupled to a second port (e.g., port 2) on network switching device 104. Target device 106 may undergo a Fabric login (FLOGI) process wherein target device 106 may request a unique 24-bit address from a Fabric Login Server. This may be followed by a Port Login (PLOGI) process to enable target device 106 to communicate with other devices (for example, host device 102) connected to network switching device 104 (or connected to other switches in the fabric). PLOGI process may enable target device 106 to inform a Fabric Name Server (not illustrated) of its personality and capabilities. These may include, for example, WWNN, WWPN, etc. HBA 110 on host device 102 may undergo a similar FLOGI process, followed by a PLOGI process. The Fabric Name Server may then be updated with WWPN-A and WWPN-C details of both HBA 110 and target device 106. A user may now create an active zone, for example, Zone-A with members WWPN-A and WWPN-C, on network switching device 104.

Once a zone is created, detection engine 120 may store mapping information in a map database (for example, a table) on network switching device 104. In some examples, the map database may map ports of the network switching device 104 (hereinafter "switch ports") to HBAs (or specific ports thereof) that are connected to the switch ports and to zones of which the HBA ports are members. For example, each entry of the map database may include an ID of a switch port, an ID of the HBA port that is connected to the switch port, and the name(s) of the zone(s) that the HBA port is a member of. In some examples, an HBA port connected to a given switch port may be a member of multiple zones, in which case there may be multiple zone names associated with the ID of the switch port in the mapping information. For example, in the environment 100 illustrated in FIG. 1, the map database may include mapping information (e.g., a database entry) that includes, for example, an ID of the HBA port, an ID of the switch port on network switching device 104 to which the HBA 110 is communicatively coupled, a zone name (or zone names) associated with the ID of the switch port, and a status of the zone. In an example, the ID of the HBA port may include a port WWN of the HBA port that is connected to the switch port, such as the WWPN-A. In an example, the ID of the port on network switching device 104 may include a Fibre Channel ID (FCID) of the port on network switching device 104. A FCID is a 24-bit field which may be used to route frames through a network fabric (for example, network switching device 104). The network fabric may assign FCIDs when a device logs into the fabric (FLOGI). In an example, detection engine 120 creates the map database. Detection engine 120 may continuously or periodically monitor the switch port on network switching device 104 where an HBA port had logged in to detect whether the HBA port is still connected/logged in and whether any new HBA port has logged in to that same switch port.

There may be a variety of reasons for why an HBA port may become disconnected from the switch port and a new HBA port be connected to the switch port. For example, HBA 110 may go bad, HBA 110 may be replaced with an upgraded version, the entire host device 102 may be replaced, HBA 110 may be replaced with a HBA of a different vendor, or the HBA port connected with the switch port may be swapped with another HBA port of HBA 110. In such case, the map database may be automatically updated by update engine 124 to indicate the corresponding zone status as inactive. Since detection engine 120 may continuously or periodically monitor the port on network switching device 104 where host device 102 had logged in through WWPN-A, detection engine 120 may now actively listen for any new host login at the port.

In case a new HBA port logs in at the same switch port on network switching device 104, the new HBA port may undergo a FLOGI process, followed by a PLOGI process, as described earlier. After successful registration, detection engine 120 may detect a state of successful login of the new HBA port with a new identifier (e.g., a new WWPN), for example, WWPN-D. Thus, detection engine 120 in network switching device 104 may automatically detect the new HBA port at the switch port where the prior HBA port 110 was coupled.

In response to the detection of the new HBA port, determination engine 122 may automatically identify the zone(s) to which the prior HBA port formerly belonged. For example, the determination engine 122 may determine the zone name(s) that the prior HBA port belonged to, from the map database on network switching device 104. In an example, detection engine 120 may determine the zone name(s) that the prior HBA port belonged to by searching the map database based on the ID of the switch port on network switching device 104 to which the new HBA port is and the prior HBA port was communicatively coupled. In an example, the ID of the port may include a FCID of the port on network switching device 104. For example, referring to FIG. 1, detection engine 120 may locate a list of zone names for all of the zones that included port WWPN-A by searching the map database based on the FCID of the port 1 to which port A is connected.

In response to the determination of the zone name(s), update engine 124 may automatically update zoning information on the network switching device 104 to replace the ID of the prior HBA port with an ID of the new HBA port, for each zone that the prior HBA port belonged to. For example, referring to FIG. 1, update engine 124 may replace WWPN-A (the ID of the prior HBA port) with WWPN-D (the ID of the new HBA port) in zoning information stored in the network switching device 104. Update engine 124 may also automatically update the map database on the network switching device 104 to replace the ID of the prior HBA port with an ID of the new HBA port. Update engine 124 may then update the status of the zone in the map database to an "active" status.

In some examples, target device 106 may include detection engine 120, determination engine 122, and update engine 124. In some such examples, the aforementioned engines may not be included on network switching device 104 of the storage area network. In examples in which the engines 120, 122, and 124 are included in the target device 106, some of the operations of the detection engine 120, determination engine 122, and update engine 124 may be the same as those described above, in which case duplicative description thereof is omitted.

Similar to the examples described above, once a zone is created, detection engine 120 on target device 106 may generate mapping information for the map database. However, unlike in the examples described above, in these examples the detection engine 120 may obtain the FCID of the switch port to which the host device 102 is communicatively coupled from network switching device 104. In an example, detection engine 120 on target device 106 may send a Fibre Channel Common Transport Command (FC_CT command) "Get GPN_ID" including a Port Identifier for which the FCID is sought. In response, a Name Server on network switching device 104 may provide the FCID of the switch port. After receiving the ID of the switch port, detection engine 120 may store mapping information in a map database (for example, a table) on target device 106. The map database and the mapping information may be similar as the examples described above (except for being stored on the target device 106 rather than on the network switching device 104), and therefore duplicative description is omitted.

As mentioned earlier, there may be scenarios where HBA 110 with port WWPN-A on host device 102 may be impacted. This may lead to removal of HBA 110 from the storage area network. In such case, network switching device 104 may send a notification including information related to the affected port to target device 106. In some examples, the notification may occur via a registered state change notification (RSCN). In response to the notification, the map database may be updated by update engine 124 to indicate the zone status of zones including port WWPN-A, as "inactive".

Detection engine 120 may continuously or periodically monitor the Fabric Name Server for a new name sever registration for the port on network switching device 104 where prior HBA port 110 had logged in through WWPN-A. In this manner, detection engine 120 may determine whether any new HBA port login has taken place at the switch port. The Fabric Name Server is an entity on the network fabric that holds information about devices in the network fabric.

In case a new HBA port logs in at the same switch port on network switching device 104, the new HBA port may undergo a FLOGI process, followed by a PLOGI process, as described earlier. After successful registration, detection engine 120 on target device 106 may detect a state of successful login of the new HBA port with a new port identifier, for example, WWPN-D. Thus, detection engine 120 on target device 106, may automatically detect the new HBA port at the port where a prior HBA port was coupled.

In response to the detection, determination engine 122 on target device 106 may automatically determine the zone name(s) that the prior HBA port belonged to, in the same manner as described above.

In response to the determination, update engine 124 on target device 106 may automatically update zoning information on the network switching device 104 to replace the ID of the prior HBA port with an ID of the new HBA port, for each zone that the prior HBA port belonged to. In an example, update engine 124 on target device 106 may use FC_CT command "AAPZ" to automatically update the zoning information on the network switching device 104.

Once the zoning information on the network switching device 104 has been updated, update engine 124 may automatically update the map database on target device 106 to replace the ID of the prior HBA port with an ID of the new HBA port. Update engine 124 may also update the status of the zone in the map database to an "active" status.

Figure 2:
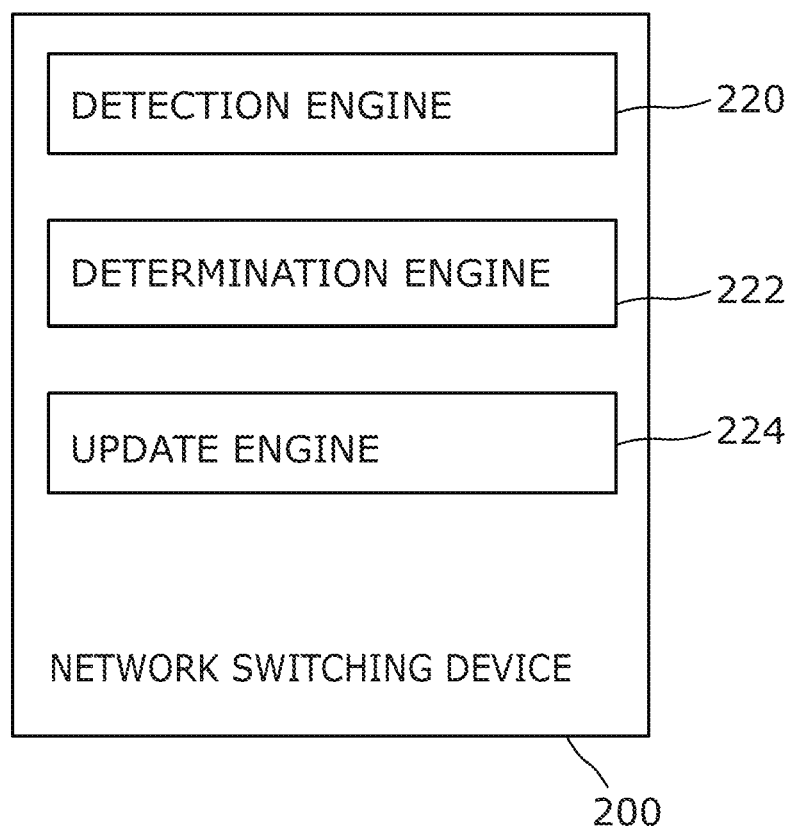
FIG. 2 is a block diagram of an example network switching device for automatically updating zoning information in a SAN.

FIG. 2 is a block diagram of an example network switching device 200 for automatically updating zoning information in a SAN. In some examples, network switching device 200 may be implemented by any suitable device, as described herein in relation to network switching device 104 of FIG. 1, for example.

In some examples, network switching device 200 may include a detection engine 220, a determination engine 222, and an update engine 224. In an example, the aforementioned engines may perform functionalities similar to those described earlier in reference to detection engine 120, determination engine 122, and an update engine 124 of FIG. 1, respectively.

In some examples, detection engine 222 on network switching device 200, which may be present in a SAN, may automatically detect a new HBA port at a port where a prior HBA port was coupled. In response to the detection, determination engine 224 may automatically determine a zone that the prior HBA port belonged to, from a map database on the network switching device that stores mapping information comprising an ID of the prior HBA port, an ID of the port, a zone name associated with the ID of the port, and a status of the zone. In response to determination, update engine 226 may automatically update zoning information on the network switching device to replace the ID of the prior HBA port with an ID of the new HBA port, for the zone that the prior HBA port belonged to.

Figure 3:
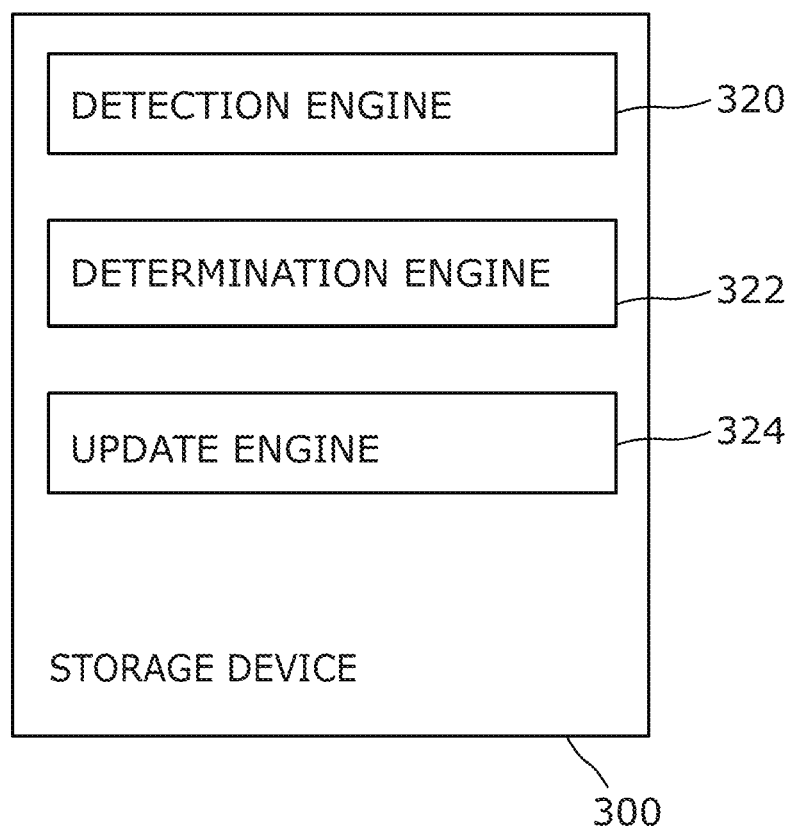
FIG. 3 is a block diagram of an example storage device for automatically updating zoning information in a SAN.

FIG. 3 is a block diagram of an example storage device 300 for automatically updating zoning information in a SAN. In some examples, storage device 300 may be implemented by any suitable device, as described herein in relation to target device 106 of FIG. 1, for example.

In some examples, storage device 300 may include a detection engine 320, a determination engine 322, and an update engine 324. In an example, the aforementioned engines may perform functionalities similar to those described earlier in reference to detection engine 120, determination engine 122, and an update engine 124 of FIG. 1, respectively.

In some examples, detection engine 320 on storage device 300, which may be present in a SAN, may automatically detect a new HBA port at a port where a prior HBA port was coupled. In response to the detection, determination engine 322 may automatically determine a zone that the prior HBA port belonged to, from a map database on storage device 300 that stores mapping information comprising an ID of the prior HBA port, an ID of the port, a zone name associated with the ID of the port, and a status of the zone. In response to determination, update engine 324 may automatically update zoning information on the network switching device to replace the ID of the prior HBA port with an ID of the new HBA port, for the zone that the prior HBA port belonged to.

Figure 4:
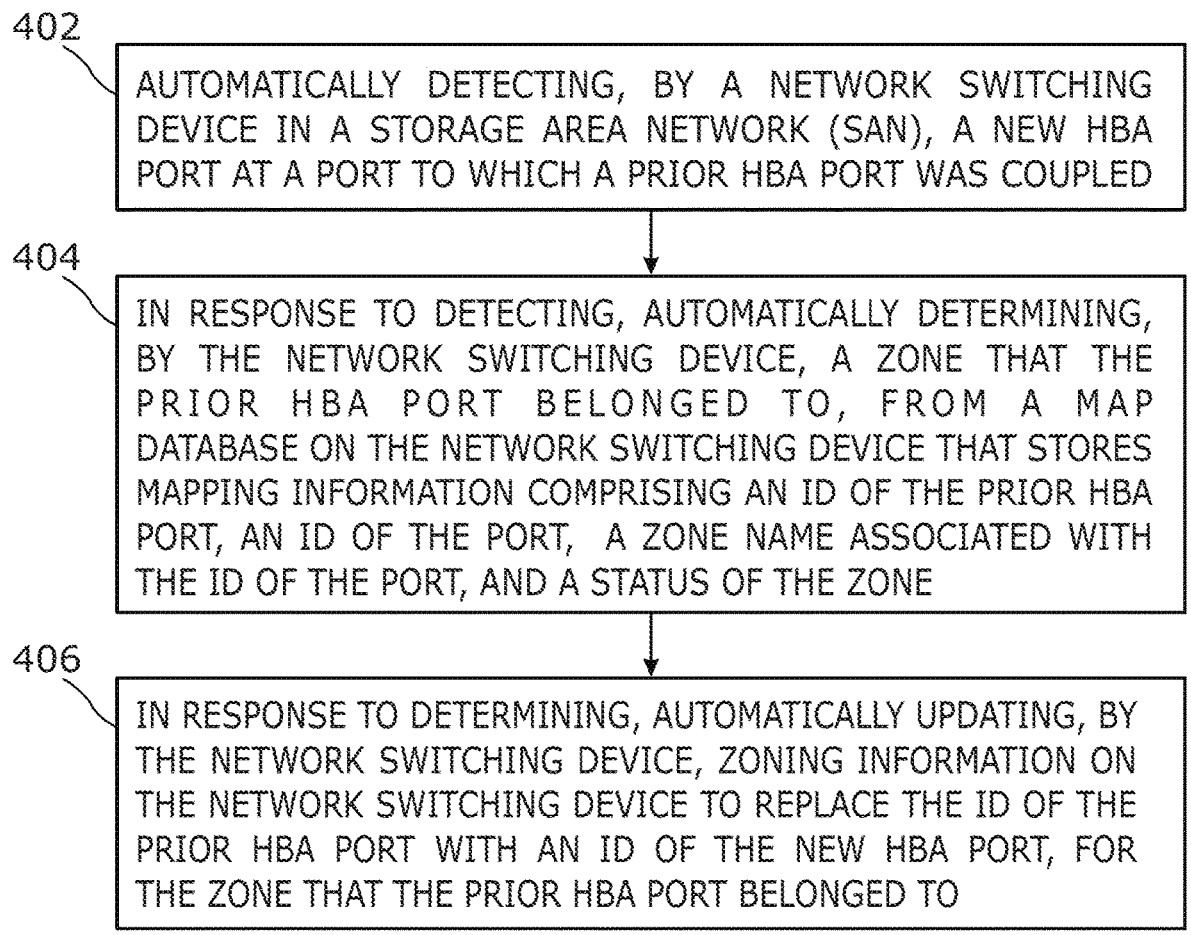
FIG. 4 is a block diagram of an example method of automatically updating zoning information in a SAN.

FIG. 4 is a block diagram of an example method 400 of automatically updating zoning information in a SAN. The method 400, which is described below, may be fully or partially executed on a device such as network switching device of FIG. 1. For example, the method 400 may be performed by a processor of the device executing machine readable instructions that cause it to perform the operations of the method 400. However, other suitable network or computing devices may execute method 400 as well. At block 402, a network switching device in a SAN may automatically detect a new HBA port at a switch port to which a prior HBA port was previously coupled. At block 404, in response to the detecting of block 402, the network switching device may automatically determine a zone that the prior HBA port belonged to, from a map database on the network switching device that stores mapping information comprising an ID of the prior HBA port, an ID of the switch port, a zone name associated with the ID of the switch port, and a status of the zone. At block 406, in response to the determining of block 404, the network switching device may automatically update zoning information on the network switching device to replace the ID of the prior HBA port with an ID of the new HBA port, for each of the zones that the prior HBA port belonged to.

Figure 5:
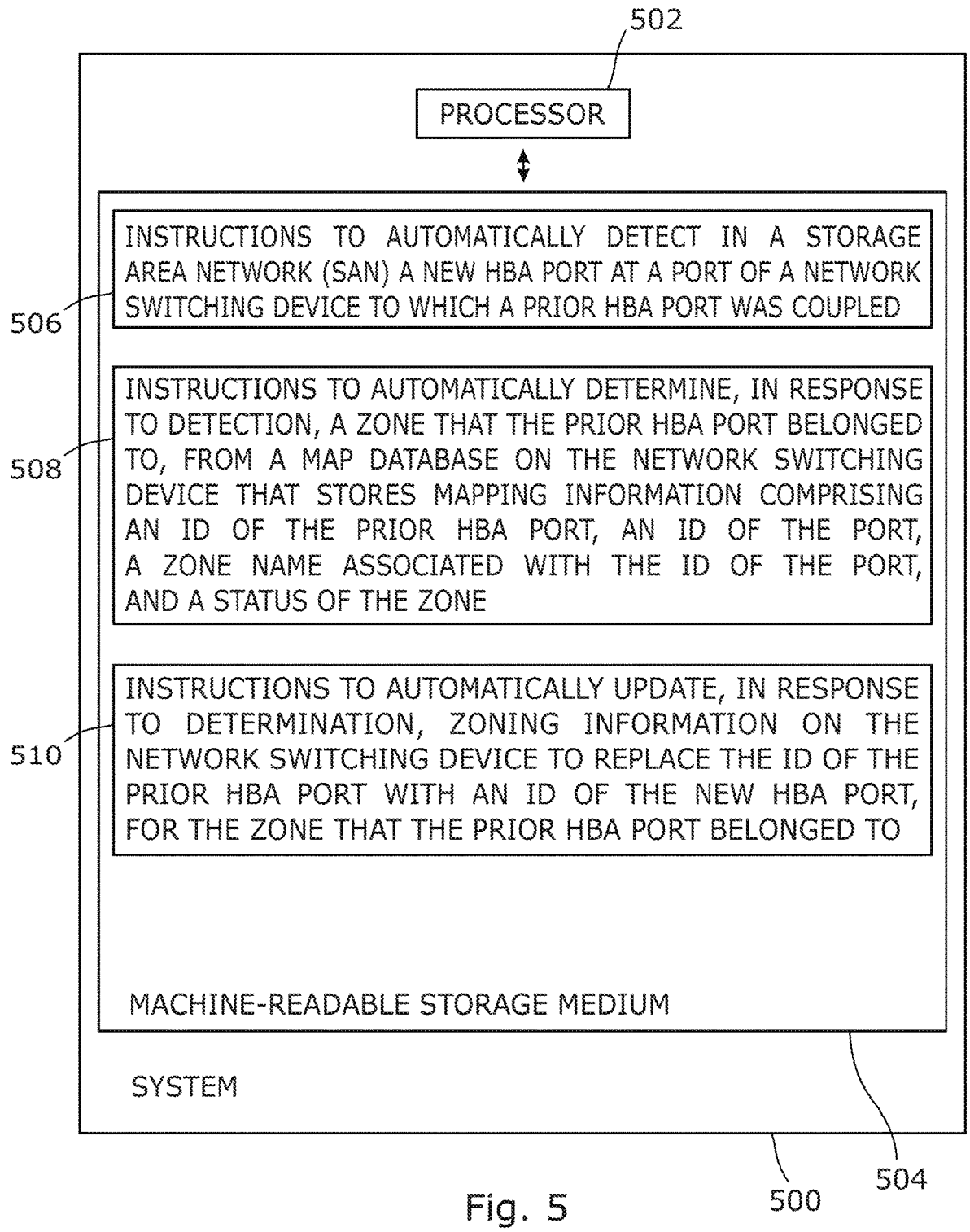
FIG. 5 is a block diagram of an example system including instructions in a machine-readable storage medium to automatically update zoning information in a SAN.

FIG. 5 is a block diagram of an example system 500 including instructions in a machine-readable storage medium to automatically update zoning information in a SAN. System 500 includes a processor 502 and a machine-readable storage medium 504 communicatively coupled through a system bus. In some examples, system 500 may be an implementation of the target device 106 of FIG. 1, or the storage device 300 of FIG. 3. In some examples, system 500 may be an implementation of the network switching device 104 of FIG. 1, or the network switching device 200 of FIG. 2. Processor 502 may be any type of Central Processing Unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In some examples, machine-readable storage medium may be a non-transitory machine-readable medium.

Machine-readable storage medium 504 may store instructions 506, 508, and 510. In some examples, instructions 506 may be executed by processor 502 to automatically detect in a Storage Area Network (SAN) a new HBA port at a port of a network switching device to which a prior HBA port was coupled. In response to the detection, instructions 508 may be executed by processor 502 to automatically determine a zone that the prior HBA port belonged to, from a map database on the network switching device that stores mapping information comprising an ID of the prior HBA port, an ID of the port, a zone name associated with the ID of the port, and a status of the zone. Instructions 510 may be executed by processor 502 to automatically update, in response to the determination, zoning information on the network switching device to replace the ID of the prior HBA port with an ID of the new HBA port, for the zone that the prior HBA port belonged to. In some examples, the 506, 508, and 510 may be such that, when executed by a processor, they cause the processor to instantiate the engines 120, 122, and 124, respectively (or the engines 220, 222, 224, respectively) (or the engines 320, 322, 324, respectively).

For the purpose of simplicity of explanation, the example method of FIG. 4 is shown as executing serially, however it is to be understood and appreciated that the present and other examples are not limited by the illustrated order. The example systems of FIGS. 1, 2, 3 and 5, and method of FIG. 4 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method comprising:
automatically detecting, by a network switching device in a Storage Area Network (SAN), a new Host Bus Adapter (HBA) port at a port of the network switching device to which a prior HBA port was coupled;
in response to the detecting, automatically determining, by the network switching device, a zone that the prior HBA port belonged to, from a map database on the network switching device that stores mapping information comprising an ID of the prior HBA port, an ID of the port, a zone name associated with the ID of the port, and a status of the zone; and
in response to the determining, automatically updating, by the network switching device, zoning information on the network switching device to replace the ID of the prior HBA port with an ID of the new HBA port, for the zone that the prior HBA port belonged to.

2. A network switching device comprising:
a network switching device port;
a processor; and
a non-transitory storage medium storing instructions executable on the processor to:
automatically detect in a Storage Area Network (SAN) a new Host Bus Adapter (HBA) port at the network switching device port to which a prior HBA port was coupled;
in response to the detecting, automatically determine a zone that the prior HBA port belonged to, based on a map database that stores mapping information comprising an ID of the prior HBA port, an ID of the network switching device port, a zone name associated with the ID of the network switching device port, and a status of the zone; and
in response to the determining, automatically update zoning information on the network switching device to replace, in the zoning information, the ID of the prior HBA port with an ID of the new HBA port, for the zone that the prior HBA port belonged to.

3. The network switching device of claim 2, wherein the instructions are executable on the processor to automatically detect the new HBA port by detecting a login by the new HBA port at the network switching device port.

4. The network switching device of claim 2, wherein the instructions are executable on the processor to update the status of the zone in the map database from an inactive status to an active status in response to the updating of the zoning information on the network switching device.

5. The network switching device of claim 4, wherein the instructions are executable on the processor is to change the status of the zone in the map database to the inactive status in response to the detecting of the new HBA port at the network switching device port.

6. The network switching device of claim 2, wherein the instructions are executable on the processor to create the map database on the network switching device.

7. The network switching device of claim 2, wherein the network switching device is one of a Fibre Channel (FC) device and a Fibre Channel over Ethernet (FCoE) device.

8. The network switching device of claim 2, wherein the ID of the prior HBA port includes a World Wide Port Name (WWPN) of the prior HBA port.

9. A storage device comprising:
a processor; and
a non-transitory storage medium storing instructions executable on the processor to:
automatically detect in a Storage Area Network (SAN) a new Host Bus Adapter (HBA) port at a network switching device port to which a prior HBA port was coupled, the network switching device port being a port of a network switching device;

in response to the detecting, automatically determine a zone that the prior HBA port belonged to, based on a map database on the storage device, the map database storing mapping information comprising an ID of the prior HBA port, an ID of the network switching device port, a zone name associated with the ID of the network switching device port, and a status of the zone; and in response to the determining, automatically update zoning information on the network switching device to replace the ID of the prior HBA port with an ID of the new HBA port, for the zone that the prior HBA port belonged to.

10. The storage device of claim 9, wherein the instructions are executable on the processor to automatically detect the new HBA port by monitoring a Fabric Name Server for a new name server registration for the network switching device port.

11. The storage device of claim 9, wherein the instructions are executable on the processor to update the status of the zone in the map database on the storage device from an inactive status to an active status in response to the updating of the zoning information on the network switching device.

12. The storage device of claim 9, wherein the ID of the new HBA port includes a World Wide Port Name (WWPN) of the new HBA port.

13. The storage device of claim 9, wherein the ID of the network switching device port includes a Fibre Channel ID (FCID) of the network switching device port.

14. The storage device of claim 9, wherein the instructions are executable on the processor to determine the zone that the prior HBA port belonged to based on the ID of the network switching device port.

15. A non-transitory machine-readable storage medium comprising instructions, the instructions executable by a processor to:

automatically detect in a Storage Area Network (SAN) a new Host Bus Adapter (HBA) port at a network switching device port to which a prior HBA port was coupled, the network switching device port being a port of a network switching device;

automatically determine, in response to the detecting, a zone that the prior HBA port belonged to, based on a map database on the network switching device, the map database storing mapping information comprising an ID of the prior HBA port, an ID of the network switching device port, a zone name associated with the ID of the network switching device port, and a status of the zone; and automatically update, in response to determination the determining, zoning information on the network switching device to replace the ID of the prior HBA port with an ID of the new HBA port, for the zone that the prior HBA port belonged to.

16. The non-transitory machine-readable storage medium of claim 15, wherein the instructions to automatically determine the zone that the prior HBA port belonged to comprise instructions to:

identify, by the network switching device, the ID of the network switching device port that is mapped to the ID of the prior HBA port, based on the mapping information in the map database; and identify, by the network switching device, the zone name associated with the ID of the network switching device port.

17. The non-transitory machine-readable storage medium of claim 15, wherein the instructions to automatically detect the new HBA port comprise instructions to:

detect, by the network switching device, a fabric login (FLOGI) of the new HBA port at the network switching device port to which the prior HBA port was coupled.

18. The non-transitory machine-readable storage medium of claim 15, further comprising instructions to:

replace, by the network switching device, the ID of the prior HBA port with the ID of the new HBA port in the map database on the network switching device.

19. The non-transitory machine-readable storage medium of claim 15, wherein the networking switching device supports at least one of a Fibre Channel (FC) protocol and a Fibre Channel over Ethernet (FCoE) protocol.

20. The method of claim 1, further comprising:

in response to the detecting of the new HBA port at the port, changing, by the network switching device in the mapping information, the status of the zone to an inactive status; and in response to the determining, updating, by the network switching device, the mapping information by replacing the ID of the prior HBA port with the ID of the new HBA port, and changing the status of the zone from the inactive status to an active status.

* * * * *